United States Patent
Golay

[19]

[11] Patent Number: 6,164,052

[45] Date of Patent: Dec. 26, 2000

[54] RETRACTABLE HAY AND BEAN FLUFFER

[76] Inventor: George Rex Golay, 2556 Kimberly Rd., Twin Falls, Id. 83301

[21] Appl. No.: 09/181,078

[22] Filed: Oct. 27, 1998

[51] Int. Cl.[7] .......................... A01D 76/00; A01D 78/00; A01D 80/00; A01D 84/00

[52] U.S. Cl. .................. 56/372; 56/366; 56/380

[58] Field of Search ............................. 56/372, 366, 376, 56/377, 378, 379, 380, DIG. 10, DIG. 24, 384, 396, 397, 365, 367

[56] References Cited

U.S. PATENT DOCUMENTS

| | | | |
|---|---|---|---|
| D. 242,914 | 1/1977 | Kilburn et al. | D15/27 |
| 2,529,422 | 11/1950 | Sampson | 56/372 |
| 2,559,862 | 7/1951 | Ferguson | 56/372 |
| 2,882,978 | 4/1959 | Smith et al. | 172/79 |
| 3,006,420 | 10/1961 | Coogan | 172/5 |
| 3,721,080 | 3/1973 | Marsh | 56/364 |
| 3,762,140 | 10/1973 | Block | 56/328 R |
| 3,866,402 | 2/1975 | Block | 56/328 R |
| 3,995,416 | 12/1976 | Van Der Lely | 56/370 |
| 4,184,314 | 1/1980 | Hobbs | 56/372 |
| 4,471,605 | 9/1984 | Ender, Sr. | 56/372 |
| 4,524,575 | 6/1985 | Nilsen | 56/372 |
| 4,524,576 | 6/1985 | Probst | 56/372 |
| 4,738,092 | 4/1988 | Jennings | 56/372 |
| 4,739,610 | 4/1988 | Schultz | 56/364 |
| 4,862,685 | 9/1989 | Gasseling et al. | 56/372 |
| 4,905,466 | 3/1990 | Heppner | 56/364 |
| 4,926,625 | 5/1990 | Laquerre | 56/376 |
| 4,977,734 | 12/1990 | Rowe et al. | 56/15.9 |
| 5,313,772 | 5/1994 | Tonutti | 56/377 |
| 5,450,717 | 9/1995 | Delperdang et al. | 56/366 |
| 5,507,139 | 4/1996 | Delperdang et al. | 56/366 |
| 5,899,055 | 5/1999 | Rowse et al. | 56/377 |

*Primary Examiner*—Robert E. Pezzuto
*Assistant Examiner*—Arpad Fabian Kovacs
*Attorney, Agent, or Firm*—Ken J. Pedersen; Barbara S. Pedersen

[57] ABSTRACT

The invented fluffer is a retractable hay and bean agricultural design for use in fluffing hay, bean and other crops. The retractable fluffer comprises: a pickup assembly 40 for fluffing hay or beans, the pickup assembly 40 is attached to and supported by a pickup frame 30, the pickup frame 30 is pivotally attached to a hitch attachment assembly 50 at a pair of pivots, the hitch attachment assembly 50 attaches to a standard three-point hitch located on the rear of a tractor 200. Preferably, a gauge wheel assembly 60 is attached to the pickup frame 30 for assisting in holding the pickup frame 30 above the surface of the ground. Benefits of the invented fluffer include maneuverability; the ability to be adjustably connected at an angle to the tractor; safety; the use of a 3-point hitch attachment; a reduction in the amount of time required for the beans or hay within the field to dry; and reducing or eliminating occurrences of mildew, molds and other fungal growths upon the undersides of the windrow and within the plant matter later harvested or baled.

3 Claims, 3 Drawing Sheets

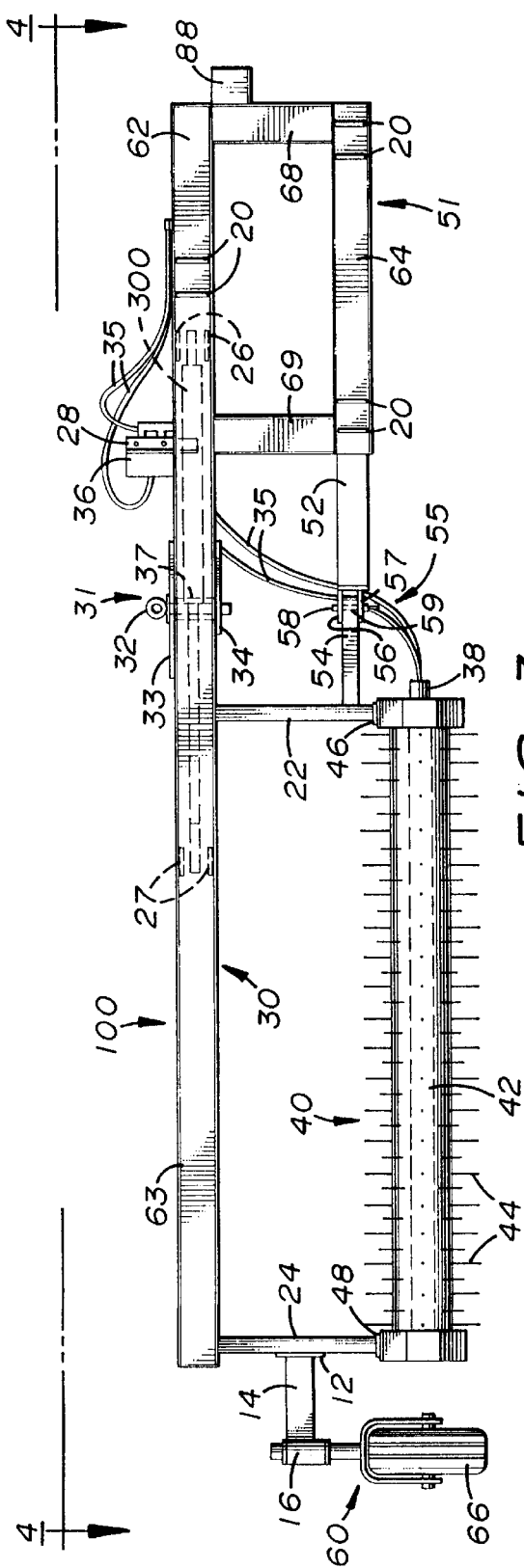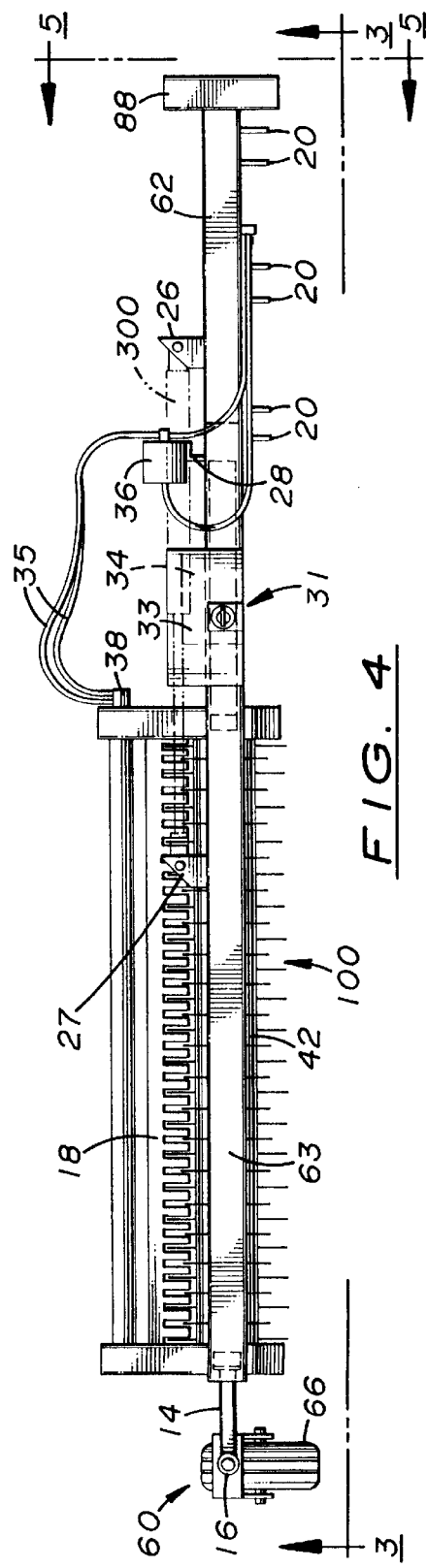

ically relates to farm equipment. More specifically, the present invention relates to tractor attachments for fluffing beans and hay.

RETRACTABLE HAY AND BEAN FLUFFER

BACKGROUND OF THE INVENTION

1. Field of the Invention

The present invention generally relates to farm equipment. More specifically, the present invention relates to tractor attachments for fluffing beans and hay.

2. Related Art

Many different farm implements are used to pick cut plant matter up from the ground. These range from fluffers to windrowers to harvesters.

Many different types of farm implements exist for the fluffing of beans and hay. Some of these implements are drawn alongside the tractor. For instance, U.S. Pat. No. 2,529,422 (Sampson) discloses a swath lifter for windrowed grain and U.S. Pat. No. 4,739,610 (Schultz discloses a windrow lifter. Neither the Sampson lifter, nor the Schultz lifter, however, are able to be maneuvered from an extended, operational position to a retracted, transport position directly behind the tractor.

Other implements are drawn directly behind the tractor. For instance, U.S. Pat. No. 2,559,862 (Ferguson) discloses an apparatus for treating windrows; U.S. Pat. No. 4,524,575 (Nilsen) discloses a windrow aerator; U.S. Pat. No. 4,524,576 (Probst) discloses a windrowed hay fluffing agricultural implement; U.S. Pat. No. 4,862,685 (Gasseling, et al.) discloses a hay windrow fluffer; U.S. Pat. No. 5,450,717 (Delperdang, et al.) discloses a crop aerator; and U.S. Pat. No. 5,507,139 (Delperdang et al.) discloses a crop aerator having a pivoted header frame. A problem with implements drawn directly behind the tractor is that the operator must steer the tractor constantly to keep the wheels of the tractor from driving across the windrows cut plant matter.

Other implements fluff beans and hay by inverting the windrow. For instance, U.S. Pat. No. 4,471,605 (Ender, Sr.) discloses a machine for inverting windrows; U.S. Pat. No. 4,738,092 (Jennings) discloses a windrow inverter and shifter; and U.S. Pat. No. 4,926,625 (Laquerre) discloses a windrow turning apparatus. Unlike these inventions, the present invention does not invert the windrow.

Other implements exist for the creation of windrows. For instance, U.S. Pat. No. 3,721,080 (Marsh) discloses a crop windrowing apparatus. This apparatus is used to create windrows and is not able to be maneuvered from an extended, operational position to a retracted, transport position directly behind the tractor, nor does this apparatus serve to aerate previously created windrows.

Other implements exist for the harvesting of beans and other grains. For instance, U.S. Design Pat. No. Des. 242,914 (Kilburn et al.) which discloses a harvester for beans. While this implement does have tines that pick up beans from this ground, this implement is not able to be maneuvered from an extended, operational position to a retracted, transport position directly behind the tractor.

SUMMARY OF THE INVENTION

The present invention is a retractable hay and bean fluffer for use in fluffing hay, beans and other crops. Fluffers are used to speed the in-field drying time of hay and beans as well as for preparing the hay and beans for processing. As plant matter is cut and left in windrows within the field, that freshly cut plant matter has a certain percentage of moisture present with it. That moisture percentage must be reduced to a desirable level before the grain or hay can be collected and safely stored due to concerns of rot, mildew, fermentation and combustion. In the field, moisture content is reduced by evaporation and heat. The greater the air circulation through the windrow of hay or beans, the quicker the moisture can evaporate out of the windrow, and the lesser the chance that the undersides of the crop will be covered with mildew or rot.

The prior art way of getting air exposure or "aeration" to windrows to speed drying is by using a rake or fluffer on the windrowed crop. This raking or fluffing process takes place after the cut crop has been left in the field for a time for drying. By raking or fluffing the windrow, air pockets are created within the cut plant matter located in the windrow and the underside of the windrow is exposed to air, thereby facilitating the drying process. Fluffing or raking is especially important after the cut crop has been exposed to moisture, such as rainfall, which serves to make the windrow wet and to pack the windrow into a dense mat, thereby inhibiting the drying process. Also, the weight of the cut crop itself over time can cause the windrow to become packed into a dense mat.

The present invention is a retractable hay and bean fluffer. Throughout the Description the terms "invented fluffer" and "retractable fluffer" are used interchangeably. Both refer to the novel mechanism allowing the fluffer to be extended, retracted and raised. The invented fluffer comprises a pickup assembly for fluffing hay and beans, the pickup assembly is attached to ant supported by a pickup frame for holding the pickup assembly above the surface of the ground, the pickup frame is pivotally attached to a hitch attachment assembly at a pivot., the hitch attachment assembly attaches to a standard three-point hitch on the rear of a tractor. The operator is able to move the invented fluffer from a retracted, transport position where the present invention is located directly behind the tractor, to an extended, operational position where the present invention is located at some degree angle to the side of the tractor.

There are many benefits to the present invention. A first benefit of the invented fluffer is maneuverability. The invented fluffer pivotally connects to the tractor. Being pivotally connected allows the operator to maneuver the invented fluffer from a traveling position, where the invented fluffer is located directly behind the tractor, to an operating position, where the invented fluffer is located rearward and to the side of the tractor. This pivotal connection allows the operator greater maneuverability in transportation of the tractor and implement to the field, and is especially useful when the operator must travel down public roadways to get to the field.

Being able to travel with the invented fluffer located behind the tractor means that the overall width of the traveling tractor is reduced, thereby making travel easier on the operator of the tractor, as well as on persons traveling along the same roadways. This pivotal attachment also allows the operator to maneuver the tractor and invented fluffer into a tight place, then swing the invented fluffer into operation mode, allowing the operator to rake and fluff areas, of the field that might otherwise be inaccessible, such as the edges and corners of the field. Such a feature also allows the operator to transport the invented fluffer to locations that are difficult for wide vehicles to enter, such as a field on the other side of a narrow bridge.

A second benefit of the invented fluffer is the ability to be adjustably connected at an angle to the tractor. For instance, the operator may choose to place the fluffing portion of the invented fluffer at a 90-degree angle relative to the tractor's forward direction of travel, or the operator may choose a different angle depending on the needs and desires of the operator. All such angles would be within a horizontal plane. While the invented fluffer may be adjusted to operated at a wide range of angles, the invented fluffer is to be preferably used at a zero degree angle, which is directly behind the tractor in what is also called a transport mode; at a 45-degree angle, where the invented fluffer can pick up a windrow and would set this windrow back down on the ground in a fluffed state at a location sightly adjacent to the windrow's original location; and at a 90-degree angle, where the invented fluffer can pick up the plant matter within the windrow, slightly fluff it, and gently return the windrow near its original position.

A third benefit of the invented fluffer is safety. By being able to be maneuvered into a rear, transport position the invented fluffer becomes safer to transport and maneuver into the field. Such rearward, transport position results in the proper maneuvering of the device being easier—thereby reducing the chance that the operator will strike an object alongside the road, within the field or the upon the road.

A fourth benefit of the invented fluffer is the use of a 3-point hitch attachment. The use of a 3-point hitch attachment results in increased control of the invented fluffer by the operator. Such an attachment allows the operator to maneuver the tractor and fluffer into positions that would ordinarily require increased skill and concentration if the invented fluffer was attached to a ball and hitch type trailer attachment. Security is another advantage of using a 3-point hitch attachment, in that the invented fluffer is attached to the tractor at three separate locations, rather than the singular attachment usually seen in ball and hitch type attachments.

A fifth benefit of the invented fluffer is the reduction in the time required for the beans or hay located within the field to dry. By gently fluffing the windrowed plant matter, the invented fluffer aerates the plant matter, thereby reducing the time required for the beans of hay to dry.

A sixth benefit of the invented fluffer is reducing or eliminating occurrences of mildew, molds and other fungal growths upon the undersides of the windrow and within the plant matter later harvested or baled. Gentle aeration of the windrows facilitates the drying of the undersides of the windrowed plant matter, thereby eliminating a necessary element to mildew, mold and other fungal growth, namely moisture.

BRIEF DESCRIPTION OF THE DRAWINGS

FIG. 3 is a front, schematic view of the device of FIG. 1 shown in its lowered, extended, operational position.

FIG. 4 is a top, schematic view of the device of FIG. 1 shown in its lowered, extended, operational position.

DESCRIPTION OF THE PREFERRED EMBODIMENTS

Within this application, both infra and supra, the following terms have the following meanings unless explicitly denoted otherwise: "inner" means toward the end of the invented fluffer nearest the tractor's three-point hitch; "outer" means away from the end of the invented fluffer furthest from the tractor's three-point hitch; "distal" means further from the three-point hitch; "proximal" means closer to the three-point hitch; "left" and "right" are used in reference to what would be considered left and right by an operator of the tractor while the operator is operating the tractor and facing forward; "clockwise" is the direction that the pickup drum turns while the device is in use, as viewed from the left side of the device as attached to the tractor.

Figure 1:
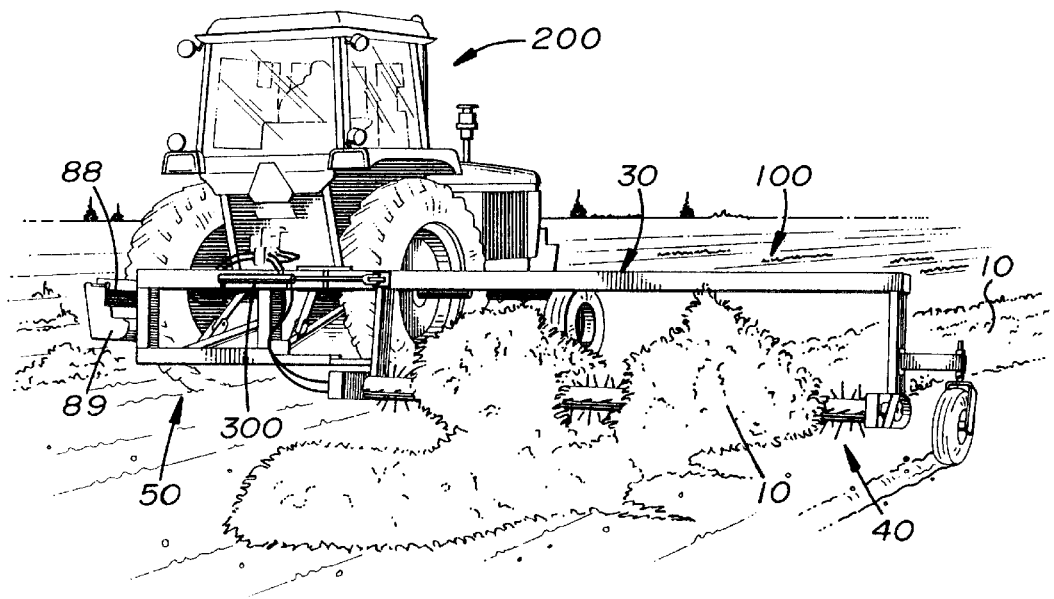
FIG. 1 is a perspective view of the invented retractable hay and bean fluffer in use in field fluffing a cut crop, shown in its lowered, extended, operational position.
Figure 2:
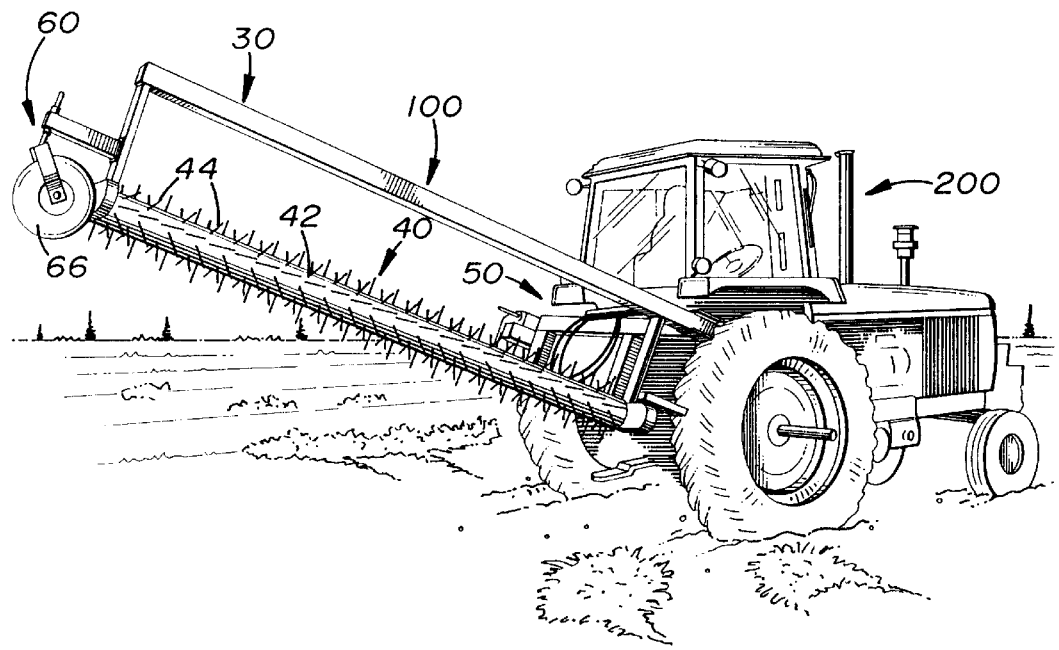
FIG. 2 is another perspective view of the device of FIG. 1 shown in its raised, retracted, transport position.

The invented fluffer is a retractable hay and bean fluffer 100. As shown in FIG. 1 and FIG. 2, the invented fluffer 100 comprises a pickup assembly 40 for fluffing hay and beans, the pickup assembly 40 is attached to and supported by a pickup frame 30 for holding the pickup assembly 40 above the surface of the ground, the pickup frame 30 is pivotally attached to a hitch attachment assembly 50 at a pivot, the hitch attachment assembly 50 attaches to a standard three-point hitch on the rear of a tractor 200. A hydraulic ram 300 is attached at one end to the hitch attachment assembly 50, and at the other end to the pickup frame 30.

Preferably, a gauge wheel assembly 60 is pivotally attached to the pickup frame 30 for assisting in holding the pickup frame 30 and pickup assembly 40 above the surface of the ground.

As shown in FIGS. 3 and 4, the pickup assembly 40 further comprises a cylindrical pickup drum 42 having a plurality of perpendicularly extending tines 44 circumscribing the exterior surface of the drum 42. This drum 42 is rotatably attached between an inner pickup attachment arm 22 and an outer pickup attachment arm 24 respectively at an inner drum attachment assembly 46 and an outer drum attachment assembly 48 of the pickup frame 30.

The tines 44 are preferably straight, however, other shaped tines 44 are also envisioned by the inventor. The tines 44 are spaced symmetrically in a concentric arrangement about the drum 42. The tines are preferably of a plastic material, 8" long, affixed in a rubber block, said tines being replaceable if broken. In the preferred embodiment, the pickup drum 42 is a premanufactured piece, called a Rehn pickup.

Attached to the pickup assembly 40, preferably at the inner and outer attachment assemblies 46, 48, is a set of stripper bars 18 extending in a mutually spaced relationship transverse to the rearward portion of the drum 42. The stripper bars 18 are arranged and positioned to receive therebetween the tines 44 as the pickup drum 42 rotates. As the pickup drum 42 rotates in a clockwise direction, the stripper bars 18 serve to strip plant matter entangled within the tines 44 from the pickup drum 42.

Figure 5:
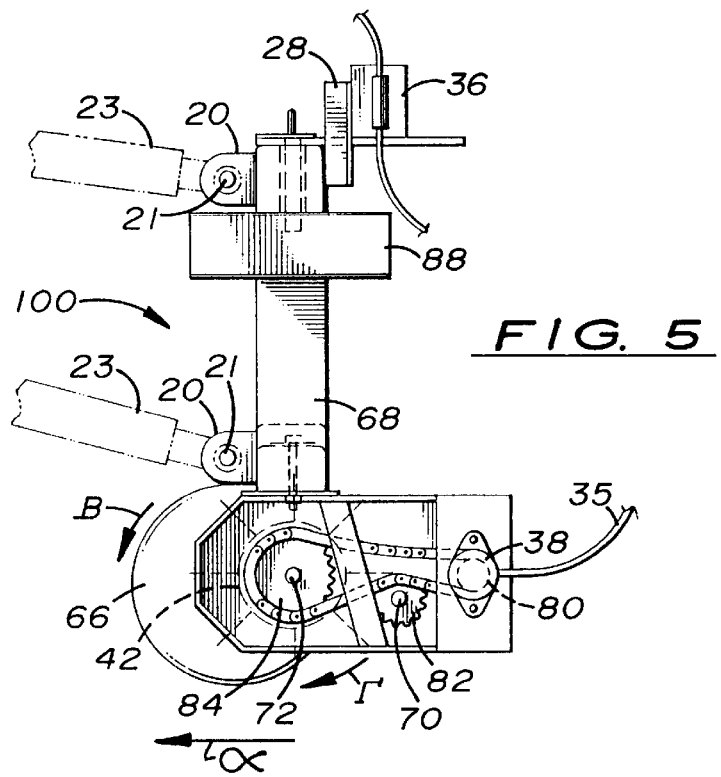
FIG. 5 is a partial, side, schematic view of the device of FIG. 1 shown in its lowered, extended, operational position.
Figure 6:
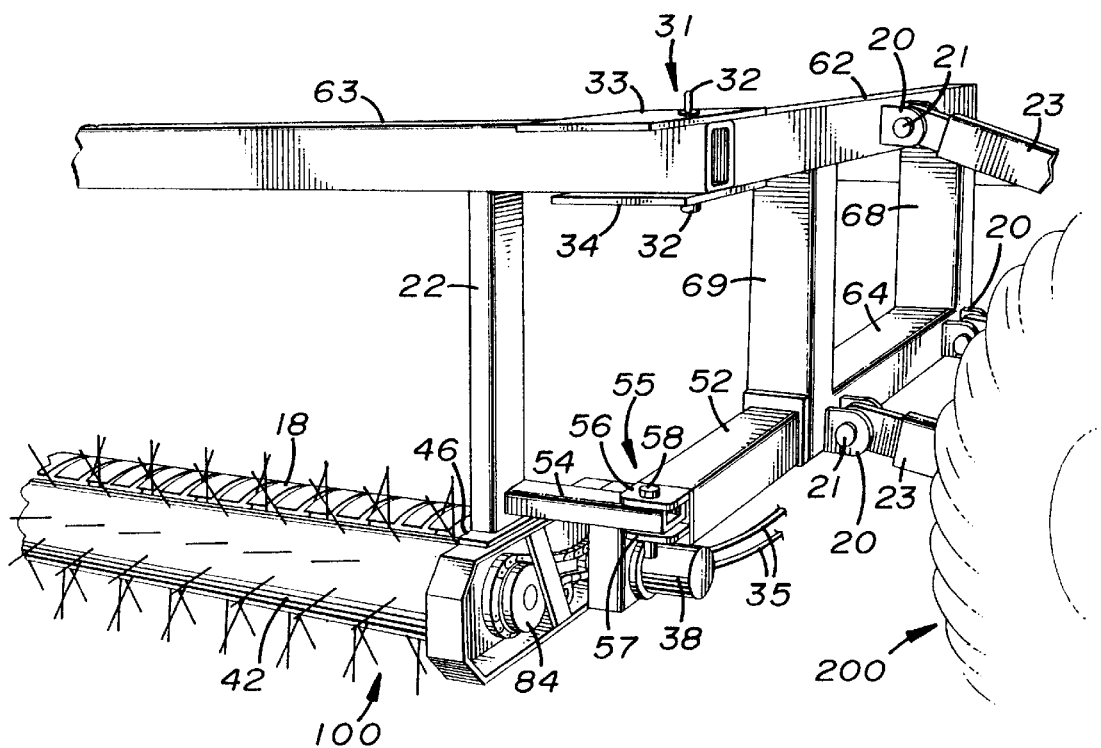
FIG. 6 is a partial, oblique, schematic view of the device of FIG. 1 shown in its lowered, retracted position.

As shown in FIGS. 5 and 6, a standard hydraulic "orbit" motor 38 is attached to either the bottom surface of the outer extension arm 54 or the inner side of the drum pickup 42. This hydraulic motor 38 is powered from the hydraulic system of the tractor 200 in the usual manner, and its speed is controlled by the operator of the tractor 200 operating a standard, hydraulic, flow control valve 36 connected into the hydraulic system of the tractor 200, by the usual pressure hoses 35.

The hydraulic "orbit" motor 38 drives a first sprocket 80 that drives a chain that turns second sprocket 82 and a third sprocket 84. The second sprocket 82 is attached to a rear shaft 70 extending beneath the stripper bars 18 the length of the pickup drum 42, and the third sprocket 84 is attached to a front shaft 72 extending through the center of the pickup drum 42. Corresponding sprockets (not shown) are also located on the distal end of the pickup drum 42 where a second chain (not shown) extends between the second sprocket 82 and the third sprocket 84. The motor 38 drives the first sprocket 80 that drives a chain turning the second sprockets 82 and the third sprockets 84, thereby causing the rotation of the drum pickup 42 in a direction opposite the forward direction of travel of the tractor 200. Preferably, the operator is also able to rotate the drum pickup 42 in the same direction as the forward direction of travel of the tractor 200 to clear any plant matter entangled upon the drum 42.

As shown in FIGS. 3 and 4, the drum 42 is rotatably attached between an inner pickup attachment arm 22 and an outer pickup attachment arm 24 respectively at an inner drum attachment assembly 46 and an outer drum attachment assembly 48.

The inner pickup attachment arm 22, for support of the pickup assembly, extends at an upper end from the frame support bar 63 to the inner drum attachment assembly 46 at its lower end. The inner drum attachment assembly 46 further attaches to the proximal end of the pickup assembly 40. The distal end of the outer extension arm 54 attaches to the inner pickup attachment arm 22 at a point near the inner drum attachment assembly's attachment 46 to the drum pickup 42.

The outer pickup attachment arm 24 extends at an upper end from the bottom surface of the frame support bar 63 at near the distal end of the frame support bar 63 to the outer drum attachment assembly 48 at its lower end. The outer drum attachment assembly 48 further attaches to the distal end of the pickup assembly 40.

In the preferred embodiment of the invented fluffer, the pickup attachment arms 22, 24 comprise steel tubing of two-inches by four-inches by one-quarter-inch size and 22 inches in length, and the drum attachment assemblies 46, 48 comprise steel plates welded to the bottom of the pickup attachment arms 22, 24, said attachment assemblies 46, 48 welded to the drum pickup 42.

Attached to the outer pickup attachment arm 24 is the gauge wheel assembly 60. In the preferred embodiment, the gauge wheel assembly 60 comprises a gauge wheel 66 pivotally attached to a gauge wheel arm 14 at a gauge wheel attachment 16. The gauge wheel arm 14 then connects to the distal surface of the outer pickup attachment arm 24. The gauge wheel 66 is premanufactured and standard to the industry. In the preferred embodiment of the invented fluffer 100, the gauge wheel extension arm 14 comprises a piece of steel tubing of two-inches by four-inches by one-quarter-inch size, and the gauge wheel assembly 60 comprises a steel plate 12 welded to the proximal end of the gauge wheel extension arm 14, said gauge wheel assembly 60 welded to the outer pickup attachment arm 24.

In the invented fluffer 100, the frame support bar 63 comprises a straight piece running parallel to the pickup drum 42. The frame support bar 63 attaches to the outer pickup attachment arm 24 near the distal end of the frame support bar 63, and attaches to the inner pickup attachment arm 22 near the proximal end of the frame support bar 63. Such attachments are preferably on the bottom surface of the bar 63. The frame support bar 63 also has an attachment 27 for receiving one end of a hydraulic ram 300, such attachment 27 is; preferably located upon and extends from the back side of the invented fluffer 100, preferably on the bar 63 at a position between the spot directly above the center of the pickup drum 42 and the attachment between the bar 63 and the inner pickup attachment arm 22. Attachment of the ram (not shown) is done in the standard manner. Use of such a hydraulic ram, allows the operator of the tractor-fluffer to move the invented fluffer 100 from a retracted, transport position to an extended, operational position. Moving the invented fluffer 100 between such positions could be done by hand, but use of a mechanical means is preferred.

The frame support bar 63 preferably comprises an 8'–11" long piece of 5 inches by 5 inches by 0.25 inch steel tubing for the hay fluffer version, and a 13'–8" long piece of 5 inches by 5 inches by 0.25 inch steel tubing for the bean fluffer version.

The proximal end of the frame support bar 63 is pivotally attached to the distal end of the upper hitch support bar 62 at an upper pivot assembly 31 and a pivot locking pin 32. The upper pivot assembly 31 comprises a top plate 33, a bottom plate 34, a pivot pin 32, and a pivot pin hole 37. The top plate 33 is a plate of steel mounted on the top surface of upper hitch support bar 62, and the bottom plate 34 is a plate of steel mounted on the bottom surface of upper hitch support bar 62, both plates extend distally from the upper hitch support bar 62. A pivot pin hole 37 extends through the top plate 33, the bottom plate 34 and the frame support bar 63. The pivot pin 32 is able to be received into the pivot pin hole 37, thereby allowing the frame support bar 63 to pivot in relation to the hitch attachment assembly 50.

This pivoting of the frame support bar 63 is assisted by the lower pivot assembly 55. The lower pivot assembly 55 is located and aligned directly below the upper pivot assembly 31. In the preferred embodiment, the lower pivot assembly 55 comprises an upper plate 56, a lower plate 57, a lower pivot pin 58 and a lower pivot pin hole 59. The upper plate 56 is a steel plate mounted on the upper surface of the inner extension arm 52. The lower plate $5_7$ is a steel plate mounted on the lower surface of the inner extension arm 52. Both plates 56, 57 extend distally from the distal end of the inner extension arm 52. Alternatively, the upper plate 56 and the lower plate 57 may be mounted on and extended from the distal surface of the inner extension arm 52, as shown in FIGS. 3 and 6. The lower pivot pin hole 59 extends through the upper plate 56, the proximal end of the outer extension arm 54 and through the lower plate 57. The lower pivot pin 58 is able to be received into the lower pivot pin hole 59, thereby allowing the outer extension arm 54 and the pickup assembly 40 and the pickup frame 30 to pivot in relation to the hitch attachment assembly 50. Preferably, the outer extension arm 54 is 13 inches in length and comprises a 2 inches by 4 inches by 0.25 inch thick piece of steel tubing.

The pivoting of the lower pivot assembly 55 cooperates with the pivoting of the upper pivot assembly 31 to allow the pickup frame 30 and the pickup assembly 40 to be swung within a horizontal plane from an extended, operational position to a retracted, transportation position. Preferably, this pivoting allows the pickup frame 30 and the pickup assembly 40 to swing from a perpendicular position in relation to the tractor 200, to a parallel position directly behind the tractor 200.

The inventor does envision that other methods of pivoting may also be used. For instance, having the pickup frame 30 and the pickup assembly 40 retract to behind the tractor 200 by pivoting within a vertical plane rather than the preferred horizontal plane.

In the invented fluffer, the hitch attachment assembly 50 comprises three pairs of 3-point hitch mounting plates 20 mounted on a hitch frame 51 comprising: an inner hitch support bar 69, an outer hitch support bar 68, a lower hitch support bar 64, an upper hitch support bar 62, and an inner extension arm 52. The hitch attachment assembly 50 comprises the above parts, all welded or otherwise affixed together into a single piece.

The pairs of 3-point hitch mounting plates 20 used are standard 3-point hitch mounts, each comprising spaced tabs or plates, each having a hole (not shown) for receiving a pin 21, as shown in FIGS. 5 and 6. The 3-point hitch mounting plates 20 are spaced apart as the standard 3-point hitches are, thus resulting in one pair of the plates 20 located near the proximal end of the lower hitch support bar 64, one pair of the plates 20 located near the distal end of the lower hitch support bar 64, and the third pair of plates 20 located on the upper hitch support bar 62, generally equidistant from the upper hitch support bar's 62 attachment to outer hitch support bar 68 and the upper hitch support bar's 62 attachment to inner hitch support bar 69. All three pairs of the plates 20 are located on the front side of the invented fluffer 100. The preferred material for these plates 20 is steel and it is believed that the best mode of attachment is through welding the plates 20 to the bars 62, 64 as discussed above.

The 3-point hitch 23 is attached to the present invention by first placing the hitch point, 23 near the hitch mounts 20, then a hitch pin 21 is inserted through a hole in one plate of a first hitch mount 20, through the hole in the first one of the hitch points 23 and then through a hole in the second plate of the first hitch mount 20. This pin 21 is then fastened in the common manner. This process is repeated for the other two hitch points 23 and the other two hitch mounts 20, thereby attaching the attachment 10 to the tractor 200.

The inner hitch support bar 69 further comprises a vertical piece attaching at a lower end to the upper surface of the distal end of the lower hitch support bar 64. Such an attachment is preferably a weld. The inner hitch support bar 69 then extends vertically to its attachment with is the bottom surface of the upper hitch support bar 62. Such an attachment is preferably a weld. The inner hitch support bar 69 preferably comprises a 16 inches long piece of 5 inches by 5 inches by 0.25 inch steel tubing.

The outer hitch support bar 68 further comprises a vertical piece attaching at a lower end to the upper surface of the proximal end of the lower hitch support bar 64. Such an attachment is preferably a weld. The inner hitch support bar 69 then extends vertically to its attachment with the bottom surface of the proximal end of upper hitch support bar 62. Such an attachment is preferably a weld. The outer hitch support bar 68 preferably comprises a 16 inches long piece of 5 inches by 5 inches by 0.25 inch steel tubing.

The lower hitch support bar 64 is a horizontal piece extending from the proximal end of the invention 100 to the inner extension arm 52. The length of the lower hitch support bar 64 is preferably 48 inches. Two pairs of 3-point hitch mounting plates are located on the front surface of the lower hitch support bar 64, one located a few inches proximally from the distal end of the lower hitch support bar 64 and the other located a few inches distally from the proximal end of the lower hitch support bar 64. The lower hitch support bar 64 preferably comprises a piece of 5 inches by 5 inches by 0.25 inch steel tubing.

The upper hitch support bar 62 is a horizontal piece extending from the proximal end of the invention 100 to the upper pivot assembly 31. The length of the upper hitch support bar 62 is preferably five feet, six inches. A pair of 3-point hitch mounting plates are located on the front surface of the bar 62, preferably said plates are centered approximately 24 inches from the proximal end of the bar 62. The upper hitch support bar 62 preferably comprises a piece of 5 inches by 5 inches by 0.25 inch steel tubing. The upper hitch support bar 62 also has an attachment 26 for receiving one end of a hydraulic ram 300, such an attachment 26 is preferably located upon and extends from the back side of the fluffer, preferably at a location on the bar 62 between the upper 3-point hitch plates 20 located on the bar 62 and the distal, lower 3-point hitch plates 20 located near the distal end of the lower hitch support bar. Attachment of the ram is done in the standard manner. Use of such a hydraulic ram, allows the operator of the tractor-fluffer to move the fluffer from a retracted, transport position to an extended, operational position.

The inner extension arm 52 is a horizontal piece extending from the distal end of the lower hitch support bar 64 to the lower pivot assembly 55. As such, the inner extension arm 52 is preferably, approximately 21.5 inches long. The inner extension arm 52 preferably comprises a piece of 3 inches by 4 inches by 0.25 inch thick piece of steel tubing.

A piece of angle iron serving as a hydraulic assembly attachment 28 is welded to the upper hitch support bar 62 for support of a standard, hydraulic, flow control valve 36 for controlling the speed of the pickup drum 42. Attachment of the valve 36 to the attachment 28 is done using the standard nuts and bolts.

Preferably, the distal surface of the outer hitch support bar 68 is a weight bracket 88 for the support of counterweights 89 to add balance the invented fluffer 100 when extended.

Differing sizes of the fluffers are envisioned. For instance, a bean fluffer, by necessity of the manner in which beans are harvested, needs to be longer than a hay fluffer, mainly due to the fact that hay is usually placed into windrows upon cutting. In manufacturing the invented fluffer to achieve these differing lengths only the frame support bar 63 and the pickup drum 42 need to be made of different lengths. For instance, one version of a hay fluffer would require a seven foot long pickup drum 42 attached beneath a frame support bar 63 of eight feet, eleven inches in length; and one version of a bean fluffer would require a twelve-foot long pickup drum 42 attached beneath a thirteen feet, eight inches long frame support bar 63.

Preferably the invented fluffer comprises an attachment for a tractor, however the invented fluffer may also comprise a drawn unit or even a self-propelled unit.

The invented fluffer 100 is used by attaching the 3-point hitch 23 of a tractor to the 3-point hitch mounting plates 20 of the invented fluffer. Preferably, the operator can tilt the top side of the invented fluffer 100 forward using the 3-point hitch, thereby elevating the distal end of the fluffer 100 for safety reasons while the fluffer is in the retracted, transport position.

As shown in FIG. 5, the directions of rotation of various parts are shown when the invented fluffer 100 is in use. The Greek letter a shows the direction of travel of the invented fluffer 100 and the tractor 200. The Greek letter $\beta$ shows the direction the gauge wheel 66 would rotate. The Greek letter $\Gamma$ shows the direction of the rotation of the drum pickup 42.

The invented fluffer 100 has two positions, a retracted, transport position and an extended, operation position. As shown in FIGS. 2 and 6, the retracted, transport position is where the hydraulic ram (not shown) is moved into a shortened state, thereby swinging the pickup frame 30 and the pickup assembly 40 rearward in relation to the tractor 200. This position is preferred for transportation due to the fact that the tractor-fluffer unit; is at its narrowest. The invented fluffer 100 can alternatively be moved into a retracted, transport position by hand, without the use of a hydraulic ram.

As shown in FIGS. 1, 3 and 4, the extended, operation position is the position that the fluffer 100 is in when in operation in the field fluffing beans or hay. If the invented fluffer 100 is in the retracted, transport position, a hydraulic ram is preferably used to move the pickup frame 30 and the pickup assembly 40 outward in relation to the tractor 200. While it is preferred that the pickup frame 30 and the pickup assembly 40 be rotated to an angle that is perpendicular to the forward direction of travel of the tractor, other angles are possible, and may be necessary depending on the needs and wishes of the operator of the fluffer 100. The fluffer 100 can be moved into the extended, operation position by hand, without the use of a hydraulic ram.

It is also envisioned that a dual fluffer model (not shown) of the invented fluffer 100 may be manufactured. As such, an additional pickup frame 30 and an additional pickup assembly 40 would be mounted on the proximal end of the hitch attachment assembly 50. The operator, would then be able to swing one of the fluffers 100 to the left of the tractor 200 and one of the fluffers 100 to the right of the tractor 200, thereby allowing the operator to fluff a field in one-half the time required if only one fluffer pickup drum 42 was used.

Although this invention has been described above with reference to particular means, materials and embodiments, it is to be understood that the invention is not limited to these disclosed particulars, but extends instead to all equivalents within the scope of the following claims.

I claim:

1. A vertical frame capable of supporting an agricultural implement, comprising:

a vertical hitch attachment assembly, said vertical hitch attachments assembly further comprising:

upper and lower horizontal hitch support bars, said horizontal hitch support bars being aligned on a vertical axis, and spaced apart along said vertical axis by, and rigidly interconnected to, inner and outer vertical hitch support bars;

said vertical hitch support bars being aligned on a horizontal axis, said horizontal axis being orthogonal to said vertical axis, said vertical hitch support bars being spaced apart along said horizontal axis at a distance sufficient to allow a means for attaching said vertical hitch attachment assembly to a three point hitch of a tractor, wherein;

said means for attaching is rigidly attached to said upper and lower horizontal hitch support bars in said space along said horizontal axis between said inner and outer vertical hitch support bars; wherein;

each vertical hitch support bar has a top end and a bottom end; and said top ends of said vertical hitch support bars are rigidly interconnected to said upper horizontal hitch support bar; and, said bottom ends of said vertical hitch support bars are rigidly interconnected to said lower horizontal hitch support bar; and, said upper and lower horizontal hitch support bars extend horizontally beyond said inner vertical hitch support bar in a direction extending away from said outer vertical hitch support bar to an upper and lower coupling means for pivotally coupling said vertical hitch attachment assembly to a vertical pickup frame, wherein;

said vertical pickup frame comprises:

inner and outer vertical frame support bars, said vertical frame support bars being aligned on a horizontal axis, each vertical frame support bar having a top end and a bottom end, wherein;

said inner and outer vertical frame support bars are spaced apart along said horizontal axis by, and rigidly interconnected at said top ends of said vertical frame support bars to, a horizontal frame support bar, said vertical frame support bars being spaced apart at a distance sufficient to allow said agricultural implement to be held between said bottom ends of said vertical frame support bars; and, said horizontal frame support bar is pivotally connected to said upper horizontal hitch support bar at said upper coupling means; and, said inner vertical frame support bar is pivotally connected to said lower horizontal hitch support bar at said lower coupling means, wherein;

said horizontal frame support bar is disposed in substantially the same horizontal plane as the upper hitch support bar; and, said vertical pickup frame is substantially supported by said vertical hitch attachment at said coupling means thereby cantilevering said vertical pickup frame from said vertical hitch attachment; and, said vertical pickup frame further comprises:

one or less than one gauge wheel assembly, wherein;

said gauge wheel assembly is pivotally attached to said outer vertical frame support bar thereby assisting in holding said vertical pickup frame above the surface of the ground; and, wherein said agricultural implement is a fluffer for fluffing hay and beans, and further comprises a pickup drum having a plurality of tines and a set of stripper bars for stripping plant matter from said tines, said stripper bars positioned to receive therebetween the tines as the pickup drum rotates; and a means for rotably coupling said bottom ends of said vertical support bars to said agricultural implement such that said vertical pickup frame is capable of holding said agricultural implement above the surface of the ground.

2. A vertical frame as in claim 1, wherein said means for pivotally coupling said vertical hitch attachment assembly to said vertical pickup frame further comprises a hydraulic ram attachment, said hydraulic ram attachment connecting said vertical pickup frame and said vertical hitch attachment assembly.

3. A vertical frame as in claim 1, wherein rotation of said pickup drum is driven by a hydraulic motor.

* * * * *